United States Patent Office 3,452,897
Patented July 1, 1969

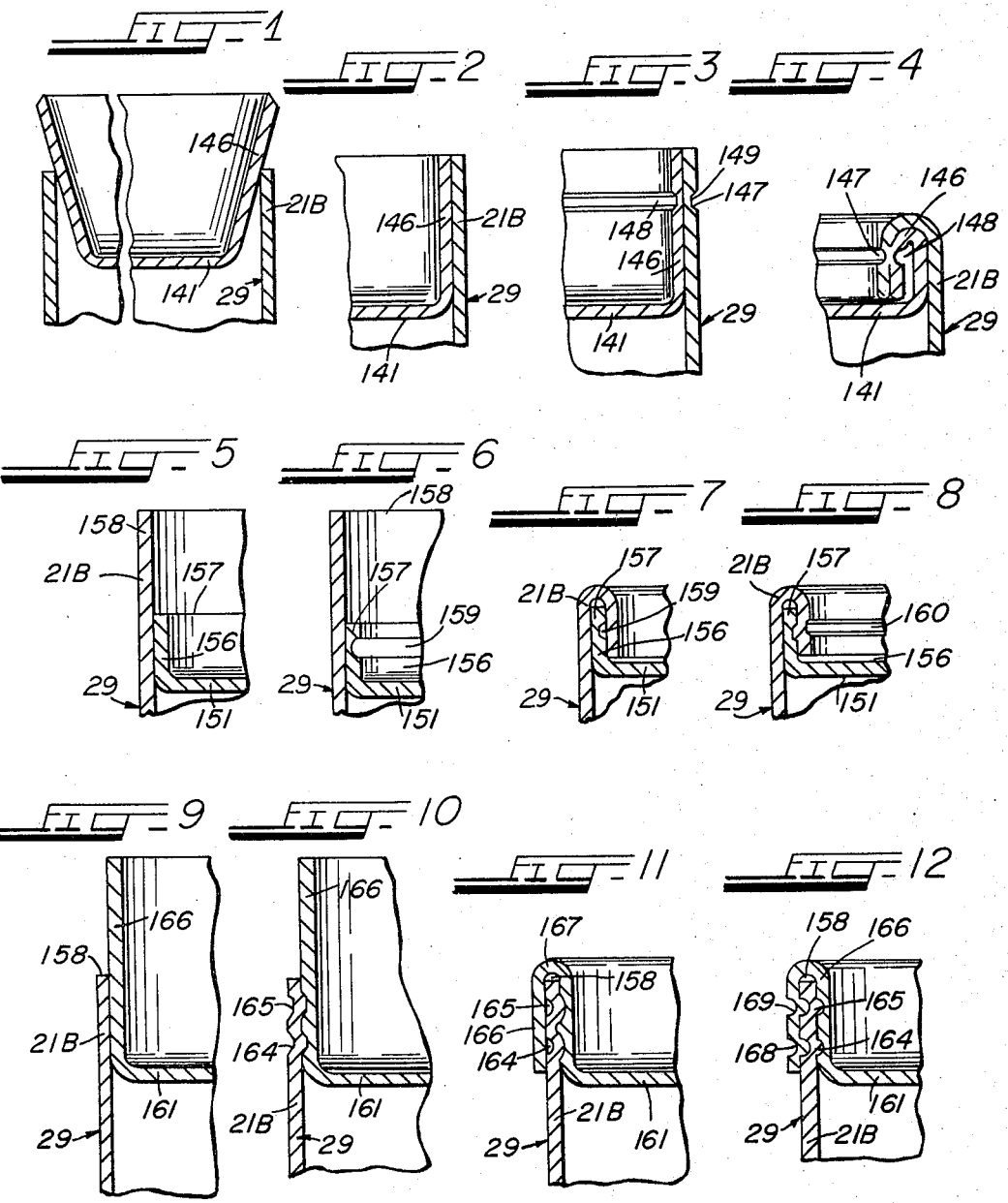

3,452,897
METHODS OF SEALING CYLINDRICAL THIN-WALL DUCTILE METAL CAN BODIES
Myron L. Anthony, La Grange, Ill., assignor of 23.75% to George W. Butler and Gladys A. Butler, both of River Forest, Ill., as trustees under George W. Butler's trust; 23.75% to Gladys A. Butler and George W. Butler as trustees under Gladys A. Butler's trust; 5% to Thomas E. Dorn, Clarendon Hills, and 5% to Norman F. Kloker, Elmhurst, Ill.
Original application Ser. No. 423,497, Jan. 5, 1965, now Patent No. 3,401,826, dated Sept. 17, 1968. Divided and this application Dec. 4, 1967, Ser. No. 687,609
Int. Cl. B65d 7/42
U.S. Cl. 220—67                  5 Claims

ABSTRACT OF THE DISCLOSURE

A method of sealing a substantially cup-shaped closure member into one end of a cylindrical thin-wall aluminum or other ductile metal can body to afford a strong mechanical hermetic seal. The closure member is positioned within one end of the can body with a sealing flange on the closure member projecting in an outward direction and approximately parallel to the wall of the can body. The two mating walls are then indented into each other along a continuous closed line extending completely around the can body; in one embodiment of the method high pressure deformation along the line of indentation affords a continuous cold pressure weld. In other embodiments, a lesser but nevertheless substantial deformation affords a good hermetically sealed mechanical interlock. After indentation the sealing flange of the closure member, the can body wall, or both of them are bent through an angle of approximately 180° to protect the interlock along the line of indentation from separation. In some instances, more than one continuous indentation is employed. The seal area may be coated with a pressure-polymerizable resin to assure a complete hermetic seal.

Cross references to related applications

This application is a division of application Ser. No. 423,497 filed Jan. 5, 1965, now Patent No. 3,401,826. Another divisional application, Ser. No. 687,614, has been filed concurrently herewith.

Background of the invention

In many applications, thin-wall ductile metal cans, particularly aluminum cans, are replacing the conventional container of tin-plated steel. For packaging plants having a moderate or relatively small volume the required investment for the plant can be substantially reduced for aluminum cans, as compared with conventional tinplate cans, particularly if some of the methods and constructions described and claimed in the two co-pending applications identified above are employed. Aluminum cans are particualrly suitable for beer and other beverages, but can also be used in the packaging of a wide variety of other products.

The conventional crimp steel used in the fabrication of most tinplate cans and like containers is not always satisfactory in the fabrication of containers of thin-wall aluminum or other relatively ductile metals. The bending strength of the metal is substantially less than with tinplate and there is a greater tendency toward development of leaks at the conjunction of the lid or base member with the cylindrical body of the can.

Summary of the invention

The principal object of the invention is to provide improved methods and means for mounting lids and bases in can bodies, in the fabrication of thin-wall aluminum and other ductile metal containers, to afford uniform hermetic seals of satisfactory mechanical strength at minimum cost.

Accordingly, the invention is directed to a method of sealing one end of a cylindrical thin-wall ductile metal can body of given configuration comprising the steps of positioning a cup-like closure member, having a sealing flange of approximately the same configuration as the end of the can body, within the wall of the can body with the sealing flange of the closure member projecting outwardly of the closure member and in approximately parallel alignment with the can body wall. The sealing flange and the can body wall are then indented, one into the other, along a continuous closed line extending completely around the can body to deform the flange of the can body wall along that line and form a continuous mechanical interlock therebetween. Thereafter, at least one of the sealing flange and can body wall is bent through an angle of approximately 180° to protect the closed line interlock against separation.

Brief description of the drawing

FIGS. 1, 2, 3 and 4 are detail sectional views illustrating successive stages in the sealing of a lid or base onto a can or like package in accordance with the present invention;

FIGS. 5, 6, 7 and 8 are detail sectional views illustrating successive stages in the sealing of a lid (or base) into a can or like package in accordance with another feature of the present invention; and FIGS. 9, 10, 11 and 12 are detail sectional views illustrating yet another technique employed for sealing lids and bases into cans constructed in accordance with the present invention.

Description of the preferred embodiments

FIGS. 1 through 4 illustrate an effective and economical procedure for sealing bases and lids into cans and like containers in accordance with the present invention. The technique illustrated in these figures is particularly applicable to thin-wall aluminum cans but can be applied to other ductile metal cans. As shown in FIG. 1, a suitable lid 141 may first be supported in the open end 21B of a can body 29. In this instance, the lid or base 141 is provided with an outwardly diverging sealing flange 146 so that, when placed in the open end 21B of the can body, the lid rests in the illustrated position. From the position shown in FIG. 1, the lid is forced inwardly of the sealing section 21B of the can body, gripping the interior of the can body in the position illustrated in FIG. 2.

With lid 141 in position, narrow continuous peripheral strips of the lid flange 146 and the can body sealing flange 21B are simultaneously forced together under high pressure, along the entire can rim and from opposite sides, as indicated by the indentations 147 and 148 in FIG. 3. Indentations 147 and 148 may be formed by appropriate rollers or by other convenient means, depending upon the configuration of the can body and the associated lid. The reduction in cross-section of the metal is made quite high, ranging from sixty to ninety percent, so that a continuous cold pressure weld is formed in the region 149 intermediate the two indentations. To facilitate this weld, the adjoining edges of the lid and can body surfaces are appropriately cleaned or otherwise treated prior to cold pressure welding. Conventional mechanical cleaning, as by scratch-brushing with a wire brush can be used; another treatment that may be employed is that described in Patent No. 3,139,678 of Myron L. Anthony and Robert F. Gill, entailing controlled oxidation of the weld surfaces.

By this above-described cold welding technique, a complete hermetic seal is formed at the periphery of the can and the lid. The sealed can could be left in the condition illustrated in FIG. 3. However, there is always some possibility that the rim portion above the indentations 147 and 148 could be broken off, particularly since the metal remaining at the seal is quite thin, which might result in a breaking of the seal for the container. Consequently, it is preferred to crimp the upper sealed portion of the can rim inwardly as shown in FIG. 4 to complete the mounting of lid 141 in the can and to protect the seal.

A further sealing technique in accordance with the present invention is illustrated in FIGS. 5 through 8. In this instance, a can lid (or base) 151 is first mounted in the smooth sealing flange portion 21B of the can body 29. Lid 151 may initially be supported in position by a slight draft to the sealing flange 156 of the lid, in the manner illustrated in FIG. 1, or by other suitable means. The lid is then forced inwardly of the can to the position shown in FIG. 5, with the upper rim 157 of the lid well below the upper rim 158 of the can body.

The next step in completing the seal illustrated in FIGS. 5–8 is to indent the initial surface of the lid flange 156 just above the surface of the lid, as illustrated in FIG. 6, forming an inner continuous peripheral indentation 159 in the lid flange. This indentation 159 need not provide for sufficient reduction in thickness of the metal to afford a cold pressure weld seal. Nevertheless, a substantial indentation should be made so that a reasonably good seal is provided at this stage of fabrication. Although only one indentation 159 is shown in FIG. 6, it should be understood that two or more indentations may be afforded if desired to increase the quality of the seal and to afford a better mechanical bond between lid 151 and the can flange 21B.

After the continuous indentation 159 is formed, the upwardly projecting portion or rim 158 of can sealing section 21B is bent over and crimped as shown in FIG. 7. If desired, an appropriate sealing compound can be employed to fill in the open space left by crimp 159 above the upper rim 157 of lid 151. This affords a strong hermetically sealed joint between lid 151 and can sealing flange 21B and completes the can structure.

Where maximum mechanical strength for the joint between lid 151 and can flange 21B is required, it is desirable to indent the inwardly crimped portion of flange 21B as shown in FIG. 8. That is, a further continuous indentation 160 is formed in the inwardly bent portion of flange 21B, preferably in alignment with the peripheral indentation 159 in lid 151. This provides a further mechanical interlock between the can body and the lid and gives even more positive assurance that the lid and body will remain hermetically sealed to each other until such time as it may be desired to open the can.

FIGS. 9 through 12 illustrate another method that may be employed to seal lids and bases into the cans. Initially, an appropriate can lid (or base) 161 is inserted into the open end or sealing flange 21B of the can body 29. The side flanges 166 of lid 161 may be initially formed with a slight draft to support the lid on the open end of the can to begin with, similar to the arrangement illustrated in FIG. 1. The sealing operation begins by forcing lid 161 into the upper open end 21B of the can body so that the flange 21B on the can body and the flange 166 on lid 161 are approximately parallel to each other as shown in FIG. 26. It should be noted that in this instance the flange 166 of lid 161 projects well above the upper edge 158 of the can body.

The next operation is to indent flange 21B from its external surface, as shown in FIG. 10. At least one complete continuous peripheral indentation is formed, and more than one indentation may be utilized as indicated by the indentations 164 and 165 in FIG. 10. The one indentation 164 is located immediately above the upper surface of lid 161. As in the sealing arrangement described above in connection with FIGS. 5–8, the reduction in thickness of metal at the indentations 164 and 165 need not be sufficient to form a cold pressure weld between the lid and the can body, but should be substantial to provide a good mechanical interlock and a reasonable seal.

The next step in this operation is to bend the upper portion of the flange 166 over the upper edge or rim 158 of the can body and to crimp the same over the rim of the can body as shown in FIG. 11. Again, an appropriate sealing compound may be utilized to fill in the indentations 164 and 165 and the open space 167 above rim 158. This arrangement provides an external flange surrounding the can lid that is particularly useful where conventional can openers are to be utilized in opening the can. Again, to provide a stronger mechanical joint, the exernal surface of flange 166 may be indented as indicated by reference numerals 168 and 169, in alignment with the indentations 164 and 165 respectively (FIG. 12). However, the latter step is not always essential and a relatively strong hermetically sealed construction is afforded even if fabrication is considered complete at the stage illustrated in FIG. 11.

In the sealing procedures illustrated in FIGS. 5–8 and 9–12, because the lowermost indentations are made near the flat face of the lid and because of the internal geometry of the lid and can structure, any tendency for the lid to move inwardly to unlock the mechanical indentation seal is effectively minimized. Expansion of the outer wall of the can could unlock the seal, but this is prevented by crimping the projecting flange over the indented flange as shown in each of these sealing arrangements. The roll crimp afforded in each instance prevents unlocking expansion of the outer wall and at the same time provides a safety edge that prevents failure by peeling at the indented joint between the lid and the can body.

As noted above, for the seal embodiments of FIGS. 5 through 12, the thickness reduction ratio is not as large as indentations used in cold pressure welding, being only about thirty percent of the combined stock thickness, compared to indentations as high as eighty or ninety percent for pressure welding. Plastic coatings or other surface contamination, as by the material contained in the can, does not interfere with the mechanical interlock seals provided by these methods. The combination of interlocking indentations and flange crimps affords strong, tightly sealed containers.

In cans provided with plastic coatings, the constructions illustrated in FIGS. 5 through 12 can be further modified to improve the quality of the hermetic seal. Thus, the lid and base flanges, or the can flange, or both, may be coated with a plastic material that polymerizes under pressure; plastic materials of this kind are now well known in the art. A commercially available pressure-polymerizable material is Eastman 910 resin. In mounting the lids in the cans as described above, the application of high pressure in the indented areas causes the plastic material to polymerize or "cure," affording extra strength to the joint as well as providing further assurance against any possibility of leakage at the seal.

I claim:
1. The method of sealing one end of a cylindrical thin-wall ductile metal can body having an open end with a sealing flange of given configuration, comprising:
   positioning a cup-like closure member, having a sealing flange of approximately said given configuration, within the wall of said one end of said can body with one of said sealing flanges projecting outwardly of and in approximate parallel alignment with the other sealing flange;
   mechanically indenting said closure member sealing flange and said can body sealing flange, one into the other, along a continuous closed line extending completely around said can body to deform said flange and the said can body wall along said line and afford a continuous mechanical coined interlock therebetween;

bending the projecting one of said sealing flanges through an angle of approximately 180° over the other and over said line of indentation to protect said interlock against separation;

and thereafter indenting said one sealing flange into said indentation in the other to afford a second interlock between said sealing flanges.

2. The method of sealing one end of a cylindrical thin-wall ductile metal can body according to claim 1 in which said closure member is positioned within said can body with the rim of said closure member sealing flange located axially inwardly of the rim of said can body, in which said closure member sealing flange is indented outwardly into said can body sealing flange while restraining said can body flange and in which said can body flange is bent inwardly over the rim of said closure member sealing flange through an angle of approximately 180° to protect the resulting continuous mechanical interlock between said can body wall and said flange against separation.

3. The method of sealing one end of a cylindrical thin-wall ductile metal can body according to claim 1, in which said closure member is positioned within the wall of said one end of said can body with its sealing flange projecting substantially above the rim of said can body sealing flange, in which said can body sealing flange is indented inwardly into said closure member sealing flange while restraining said closure member sealing flange against inward movement, and in which said closure member sealing flange is bent outwardly over the rim of said can body sealing flange through an angle of approximately 180° to protect the resulting continuous mechanical interlock between said can body wall and said sealing flange against separation.

4. The method of sealing one end of a cylindrical thin-wall ductile metal can body according to claim 1 and including the additional step of coating at least one of the mating surfaces of said sealing flanges with a pressure-polymerizable resin coating, prior to positioning of said closure member in said can body, said resin coating being polymerized by the pressure applied along and adjacent said line of indentation to assist in forming a hermetic seal between said flange and said can body along said line.

5. A thin-wall aluminum can comprising:

a cylindrical can body having smooth sealing sections at the opposite ends thereof;

and a pair of aluminum closure members, each sealed into a respective end of said can body, each closure member including a peripheral sealing flange extending substantially parallel to the can body wall in surface-to-surface contact with a respective one of said sealing sections;

said closure member sealing flange and said can body sealing section being hermetically sealed and mechanically interlocked by indenting one into the other along a continuous line and by crimping one over the other continuously around said can body;

and a pressure polymerized resin coating on at least one of the mating surfaces, at the line of indenture of said sealing flange and can body sealing section polymerized by said indenture to complete a hermetic seal between said surfaces.

References Cited

UNITED STATES PATENTS

| | | |
|---|---|---|
| 1,556,651 | 10/1925 | Walker. |
| 1,667,888 | 5/1928 | Graham _____ 220—67 |
| 1,695,563 | 12/1928 | Stollberg _____ 113—120 |
| 2,327,731 | 8/1943 | McClary _____ 220—67 X |
| 2,388,300 | 11/1945 | Wackman _____ 220—67 X |
| 2,608,887 | 9/1952 | Sowter. |

FOREIGN PATENTS

| | | |
|---|---|---|
| 523,988 | 4/1956 | Canada. |
| 658,945 | 3/1963 | Canada. |
| 60,102 | 3/1954 | France. |
| 140,184 | 3/1920 | Great Britain. |
| 220,391 | 8/1924 | Great Britain. |

JOSEPH R. LECLAIR, *Primary Examiner.*

J. R. GARRETT, *Assistant Examiner.*

U.S. Cl. X.R.

220—81, 120, 121